W. R. FOX.
FLEXIBLE SHAFT COUPLING.
APPLICATION FILED JAN. 15, 1916. RENEWED JAN. 27, 1919.

1,304,757. Patented May 27, 1919.

Inventor:
William R. Fox,
by Spear, Middleton, Donaldson & Spear
Attys.

UNITED STATES PATENT OFFICE.

WILLIAM R. FOX, OF GRAND RAPIDS, MICHIGAN.

FLEXIBLE SHAFT-COUPLING.

1,304,757.          Specification of Letters Patent.      Patented May 27, 1919.

Application filed January 15, 1916, Serial No. 72,310. Renewed January 27, 1919. Serial No. 273,447.

*To all whom it may concern:*

Be it known that I, WILLIAM R. Fox, a citizen of the United States, residing at Grand Rapids, Michigan, have invented certain new and useful Improvements in Flexible Shaft-Couplings, of which the following is a specification.

The present invention relates to improvements in flexible shaft couplings and pertains more particularly to certain improved details of construction in the type known as "universal ball joints".

The principal object of the invention consists in providing a universal joint of the type above referred to which will be simple in construction, economic in the cost of production and peculiarly durable and efficient in the numerous uses to which it may be applied.

Among other objects the invention contemplates the provision of a ball joint in which a comparatively small number of parts are necessary and in which many of the loose fastenings, rivets, bolts and so forth heretofore employed, are completely dispensed with.

With these and other objects in view, the invention consists in the combination and arrangement of parts more fully described in the following specification, illustrated in the accompanying drawings and more particularly pointed out in the appended claims.

Figure 1:
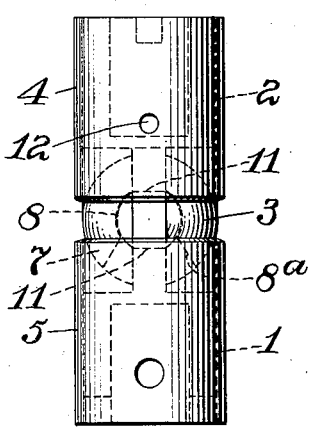
Figure 1 illustrates one form of the present invention, seen in front elevation.
Figure 2:
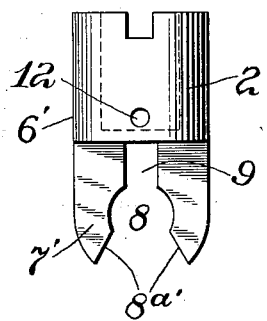
Fig. 2 is a similar view of one of the fork members, the outside sleeve being removed.
Figure 3:
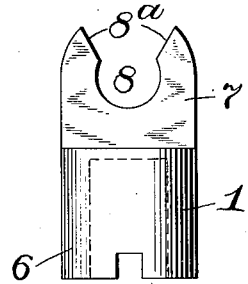
Fig. 3 is a view similar to Fig. 2 of the other fork member.
Figure 5:
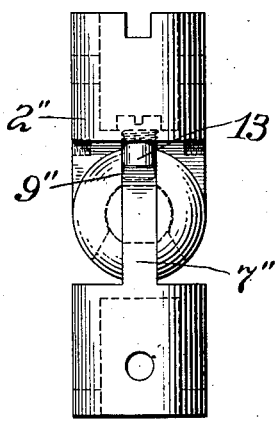
Figs. 5 and 6 are front elevation and longitudinal sectional views, respectively, of another form of the invention.
Figure 4:
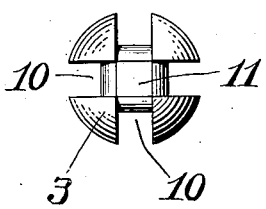
Fig. 4 is a perspective view of the ball member of the joint, removed.
Figure 6:
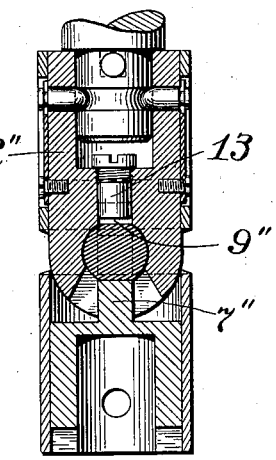
Figure 9:
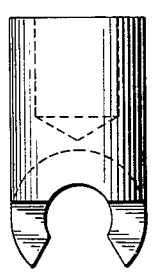
Fig. 9 is a view similar to Fig. 2 of the modified form shown in Figs. 7 and 8.

Referring now to the drawings, the preferred form of the invention is illustrated in Figs. 1 to 4 inclusive. The joint itself consists essentially of three parts, viz, the fork members 1 and 2 and ball member 3. In this form a pair of outer sleeves 4 and 5 are used on the finished joint, the purpose of which will be hereinafter explained. One of the fork members 1 consists of a hollow cup-shaped sleeve, or "coupling" head 6 adapted to receive the end portion of one of the shafts to be coupled. Projecting beyond the end of the coupling head and integral therewith is the fork member 7 disposed transversely across the diameter of the member 1 and being in the general form of a plate with parallel sides. The plate portion 7 is provided with a centrally located circular opening 8 and has a segmental portion cut away, leaving an opening with converging sides 8$^a$ communicating with the central aperture 8. The other fork member 2 is similarly formed with a hollow head 6', and an aperture plate 7' of same shape and dimensions as the plate 7 with the one exception that this one is provided with an additional rectangular opening 9 equal in width to the smallest distance across the opening between the converging faces 8$^{a\prime}$ and communicating therewith. The ball 3 is of substantially spherical formation and is provided with transversely disposed circumferential grooves 10, which receive the open ends of the forks or plates 7, 7'. In order to assemble or separate these members at pleasure diametrically opposed flat spots 11 are provided at the intersections of the grooves 10, and the diameter of the neck between these spots is thus reduced so that it equals the smallest distance between the converging faces 8$^a$ and 8$^{a\prime}$, while the unflattened inner diameters of the grooved ball are substantially equal to the diameter of the circular apertures 8 and 8', being slightly smaller to allow easy play between the parts.

In assembling the parts, the ball 3 is inserted on the forked plate 7' of the part 2, the ball being so held that the flat portions 11 register with the opening between the edges 8$^{a\prime}$. The ball is then given a quarter turn to bring one of the grooves 10 in alinement with the opening 9, in which position the other coupling head 1 is applied by bringing the forked plate 7 into engagement with the groove 10, the member 1 being held for this purpose at right angles to the part 2 carrying the ball 3. Once the three parts are in intimate engagement with one another the outer sleeves 4 and 5 can be applied and permanently secured to the outer cylindrical surfaces of the coupling heads 1 and 2. The outer sleeves 4 and 5 are forced or shrunk onto the members 1 and 2, hence no screws, rivets or other loose parts are needed. A suitable oil port 12 may be formed in the outer sleeve and fork 4 and 2, so that the parts can be freely lubricated. Were it not for these outside sleeves, which limit the motion of the parts, it would be necessary to provide some retaining means to prevent the separation of the parts should one of the coupling heads for any reason be turned at right angles to the other. The sleeves besides preventing the joint from locking, strengthen the joint structure and give to it a neat and finished appearance, and also retains the oil.

In the modified forms of the invention shown in Figs. 5, 6, 7 and 8, the outer sleeves may be dispensed with entirely and means are provided for positively retaining the three joint members against accidental separation. In the form shown in Figs. 5 and 6 this means comprises a single screw 13, whose diameter is exactly equal to the thickness of the forked plate 7''. The screw is inserted, after the joint parts are assembled in a screw-threaded hole formed through the end of the coupling head 2'' and disposed centrally thereof. The lower end of the screw 13 will thus project into and fill the opening 9'' so as to preclude the possibility of the members coming apart.

Figure 7:
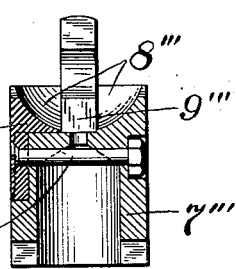
Fig. 7 is a view showing partly in elevation and partly in section a joint fork with modified retaining means.
Figure 8:
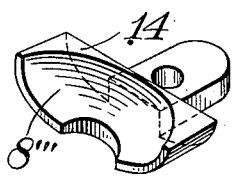
Fig. 8 is a perspective detail of the retaining means illustrated in Fig. 7.

A further modified form is shown in Figs. 7 and 8 in which means of a different character are provided for the purpose of holding the parts against separation. In this case a piece 14 is inserted in the fork 7''' before the circular cavity 8''' is milled out and retained in position by the screw threaded bolt 15. After the cavity has been milled out the screw or bolt 15 and the block, which then has the form shown in Fig. 7 can be removed and the parts of the joint assembled as in the previous forms. The pin 15 holds the block 14 in position, preventing the upper fork in its extreme inclined position from entering the recess 9''' as the circular top portion, corresponding to the contact surface of the sleeves in Fig. 1, limits the angular movement of the parts.

A rivet could be inserted in place of bolt 15 and to further guard against either bolt or rivet coming out, and to give the joint the same finish and appearance as the construction shown in Fig. 1, the same sleeve could also be forced on to the construction of Fig. 7.

In the construction shown in Fig. 7 the cavity 8''' is made to have a running fit with the ball. This serves to take a portion of the twisting strain off from the driving operation of the fork 7, by affording a bearing surface in contact with a portion of the ball.

It is not alleged that the use of sleeves is novel *per se*, but in every case in which they have been employed heretofore, so far as applicant is aware, it has been for the purpose primarily of holding loose members in position.

Having thus described my invention what I claim is:—

1. A universal joint comprising a pair of coupling heads, each provided with a forked member, a ball having intersecting circumferential grooves with diametrically arranged curved portions and diametrically arranged flattened portions at the bottom of the intersecting grooves, said forked members being of a width corresponding substantially to the diameter of the ball and each having curved inner faces corresponding to the diameter of the curved reduced portion of the ball at the bottom of the grooves and adapted to freely slip over the flattened portions and to turn on and be retained by the curved surfaces of the reduced part and a sleeve carried by each of the coupling heads and having an interior diameter at its end substantially equal to the diameter of the ball, said sleeves terminating on opposite sides of the center plane of the ball and with a space between their opposing edges to allow the heads to assume angular positions relative to each other, the opposing ends of said sleeves by contacting with each other limiting said angular relation, substantially as described.

2. A universal joint comprising a pair of coupling heads having each a cylindrical body portion and a projecting fork, a ball having intersecting grooves, the bottoms of which have diametrically arranged flattened portions and diametrically arranged curved portions, said forks being of a width not greater than the diameter of the ball and having inner curved surfaces spaced apart to pass freely over the flattened portions but to fit closely upon the curved surfaces at the bottoms of the grooves to be retained thereby and sleeves of cylindrical form fixed on the cylindrical portions of the heads, projecting therefrom and extending over the forks, the internal diameter of each of said cylindrical sleeves being substantially equal to the diameter of the ball, said sleeves terminating on opposite sides of the central plane of the ball, leaving a space between them for the angular displacement of the coupling heads, the opposing ends of said sleeves limiting the angular movement of the coupling heads by contacting with each other, substantially as described.

3. A universal joint comprising a pair of coupling heads each provided with a bifurcated fork member formed with a circular cavity, one of said members being further provided with an opening in line with the fork opening, a ball having intersecting circumferential grooves, said fork members adapted to engage with the grooves on said ball member, means whereby the heads may be separated when turned to positions at right angles to each other, and means adapted to be inserted in the opening in said fork member to limit the angular positions of the forks, thereby preventing separation of the parts.

4. A universal joint comprising a pair of coupling heads, each provided with a bifurcated fork member, one of said members being formed with an additional opening in line with the fork opening, a ball member having intersecting circumferential grooves, an opening formed in one of said coupling heads communicating with said additional opening, means whereby the heads may be separated when turned to positions at right angles to each other, and means adapted to be inserted in said opening for preventing separation of the parts.

5. A universal joint comprising a pair of coupling heads, each provided with a bifurcated fork member, one of said members being provided with a removable insert piece adjacent the fork member, a ball having intersecting circumferential grooves, said fork members adapted to engage with the grooves on said ball, means whereby the heads may be separated when turned to positions at right angles to each other, and means for retaining said insert piece permanently in position to prevent the separation of the parts.

6. A universal joint comprising a pair of coupling heads, each provided with a forked member, a ball having intersecting circumferential grooves with diametrically arranged curved portions to retain the forks, which forks are detachable from the ball at the intersection of the grooves when the heads are turned at right angles to each other, said forks being of a width corresponding substantially to the diameter of the ball and a sleeve carried by each coupling head and having an interior diameter substantially equal to the diameter of the ball, said sleeves terminating on opposite sides of the center plane of the ball and with a space between their opposing edges to allow the heads to assume angular positions relative to each other, the opposing ends of the sleeves by contacting with each other limiting said angular relation to less than a right angle.

7. A universal joint comprising a pair of coupling heads, each provided with a forked member, a ball having intersecting circumferential grooves with curved bottom portions arranged diametrically opposite each other to retain the forks, which forks are detachable from the ball at the intersection of the grooves when the heads are turned at right angles to each other, said forked members being of a width no greater than the diameter of the coupling heads, and a sleeve carried by each coupling head and having an internal diameter throughout equal to the diameter of the coupling head, said sleeves partly inclosing the ball and terminating on opposite sides of the center plane of the ball and with a space between their opposing edges to allow the heads to assume angular positions relative to each other, the opposing ends of the sleeve by contacting with each other limiting said angular relation to less than a right angle, substantially as described.

In testimony whereof I affix my signature in presence of two witnesses.

WILLIAM R. FOX.

Witnesses:
 FLORENCE A. GERMAN,
 MYRA JONES.